US009538419B2

(12) United States Patent
Kim et al.

(10) Patent No.: US 9,538,419 B2
(45) Date of Patent: Jan. 3, 2017

(54) METHOD AND APPARATUS RELATING TO CONGESTION CONTROL

(75) Inventors: Seungtai Kim, Solna (SE); Karl-Johan Lundkvist, Solna (SE); Martin Skarve, Enebyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 14/387,397

(22) PCT Filed: Mar. 28, 2012

(86) PCT No.: PCT/SE2012/050338
§ 371 (c)(1),
(2), (4) Date: Sep. 23, 2014

(87) PCT Pub. No.: WO2013/147656
PCT Pub. Date: Oct. 3, 2013

(65) Prior Publication Data
US 2015/0117185 A1    Apr. 30, 2015

(51) Int. Cl.
*H04W 28/02*  (2009.01)
*H04W 72/04*  (2009.01)

(52) U.S. Cl.
CPC ..... *H04W 28/0289* (2013.01); *H04W 28/0247* (2013.01); *H04W 72/0486* (2013.01)

(58) Field of Classification Search
None
See application file for complete search history.

(56) References Cited

U.S. PATENT DOCUMENTS

| 8,254,368 B2* | 8/2012 | Huber | G06Q 20/1235 |
| | | | 370/310 |
| 8,644,176 B1* | 2/2014 | Shah | H04L 47/10 |
| | | | 370/252 |

(Continued)

FOREIGN PATENT DOCUMENTS

| EP | 1217852 A1 | 6/2002 |
| WO | 0223329 A2 | 3/2002 |
| WO | 2008155624 A2 | 12/2008 |

*Primary Examiner* — Eunsook Choi
(74) *Attorney, Agent, or Firm* — Murphy, Bilak & Homiller, PLLC (57) ABSTRACT

A method and apparatus for enabling service aware congestion control of PS (Packet Switched) data to be performed in a communication network. In the communication network PS data is communicated between a core network of the communication network and one or more User Equipments, UE, via the communication network node. Each UE is associated to the core network by one or more PS connections, and each of the PS connections is applied by the UE for a respective PS data service. When performing the service aware congestion control, information related to a respective PS data service is obtained, and priority information is provided to a resource manager arranged in the communication network. The priority information is based on the information related to the respective PS data service for a plurality of the PS connections. The resource manager is then enabled to perform congestion control of the PS connections based on the priority information. By determining for which PS data services the PS connections are currently applied, and prioritize the PS connections accordingly, the communication network node may reallocate RAN communication resources to higher prioritized PS data services from less prioritized PS data services. Thereby, a more flexible and effective use of available RAN communication resources may be achieved.

17 Claims, 5 Drawing Sheets

(56) References Cited

U.S. PATENT DOCUMENTS 8,761,095 B1 * 6/2014 O'Brien .............. H04W 28/24
370/329
2007/0253438 A1 11/2007 Curry et al.
2008/0279139 A1 11/2008 Beziot et al.

* cited by examiner

METHOD AND APPARATUS RELATING TO CONGESTION CONTROL

TECHNICAL FIELD

The present disclosure relates generally to a method and an apparatus for handling congestion control in communication networks, especially for communication of packet switched data in e.g. wireless communication networks.

BACKGROUND

With the emergence of telecommunication services, various technologies have been developed for communicating data in telecommunication networks. One example of such a technology is WCDMA (Wideband Code Division Multiple Access), which is capable to distribute as well PS data, (Packet Switched), as CS data (Circuit Switched).

In this description, the term "User Equipment" (UE) will be used to denote any suitable communication terminal adapted to communicate with a radio base station. A UE, may be implemented as a mobile phone, a PDA (Personal Digital Assistant), a handheld computer, a laptop computer, etc. A "radio base station" may be implanted as a NodeB, an eNodeB, a repeater, etc.

In telecommunication networks, as well PS data as CS data is communicated between UE:s and a core network. Typically, a UE is associated to the core network via a radio access network (RAN). Logical connections, defined as "Radio Access Bearers" (RAB), are set up between each UE and the core network and serve both communication of PS data and communication CS data. RAB:s are dynamic and can change communication rate, and in the communication system Radio Access Network (RAN) communication resources, can be reallocated from one RAB to another RAB by a radio network controller, which is arranged to control communication in the communication network. In this description, the term "PS connection" denotes a logical connection applied for one PS data service of a UE, between the UE and the core network. Generally, each PS data service uses one respective PS connection, and a plurality of PS connections may be applied by the UE on an RAB set up between the UE and the core network. Moreover, typically, one or more CS data services for the UE may also apply the RAB. However, this description relates to PS data services, and the CS data services will not be further mentioned herein.

Figure 1:
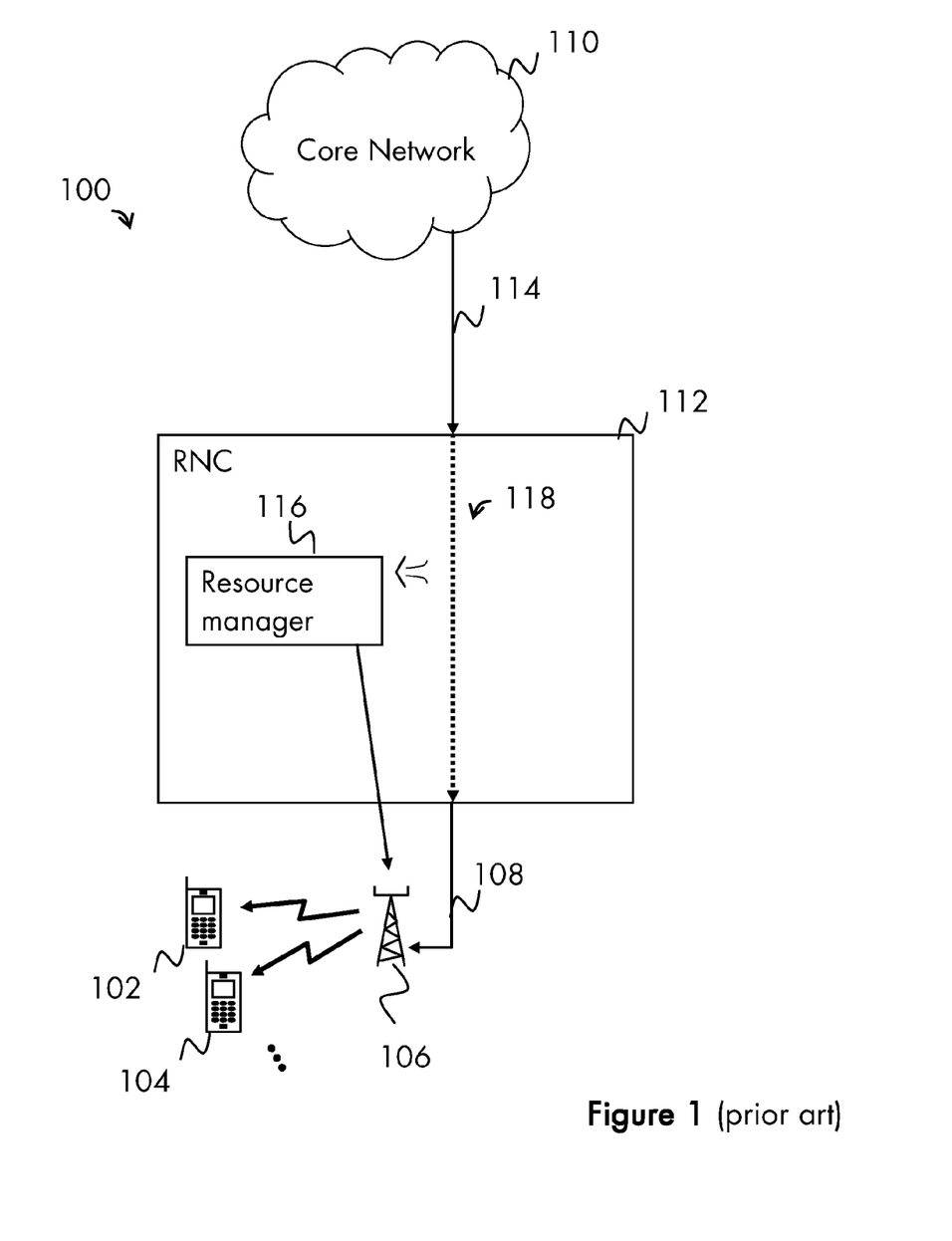
FIG. 1 is an environmental illustration of a communication system, according to the prior art.

With reference to FIG. 1, a communication system 100 according to the prior art will now be described.

In the communication system 100, PS data is communicated between one or more User Equipments (UE) 102, 104, . . . , and a core network 110. A radio access network (not referred to) and a radio network controller 112 distributes PS data between the UE:s 102, 104, . . . , and the core network 110. When communicating PS data, the radio network controller 112 receives PS data from the core network 110 on a first communication link 114, and transmits the PS data intended for a specific UE 102 to a radio base station 106 on a second communication link 108, the radio base station 106 which serves the specific UE 102. The PS data flows through the radio network controller 112, and the PS data flow 118 is shown as a dotted line in the figure. Then the radio base station 106 transmits the PS data to the specific UE 102 on one or more PS connections (not shown in the figure) between the radio base station 106 and the specific UE 102. The PS connections are logic connections between the core network and the respective UE:s, 102, 104, . . . . Communication of PS data between the radio base station 106 and specific UE:s 102, 104 is illustrated by flash formed arrows in the figure. In the radio network controller 112, a resource manager 116 is arranged to control the RAN communication resources used to transmit PS data from the core network and select the radio base station 106 which currently serves the specific UE 102. When controlling the RAN communication resources, the resource manager 116 analyses the PS data flow 118 and allocates RAN communication resources to the PS connections, based on various predefined policies. Such policies may be defined based on Quality of Services (QoS) classes, end-users subscriptions, etc. Typically, a PS connection according to a higher QoS class and/or a more advanced subscription will be prioritised to get RAN resources allocated, than PS connections according to lower QoS classes or less advanced subscriptions.

Due to massive increase of packet switched data traffic in communication networks, there is a need to handle congestions of communicated PS data in the communication system, still providing enough communication resources to the end-users.

SUMMARY

It is thus an object of the invention to address at least some of the limitations, problems and issues outlined above.

According to one aspect, a method in a communication network node for a communication network is provided for enabling congestion control of Packet Switched, PS, data, in the communication network, where the PS data is communicated between a core network of the communication network and one or more User Equipments, UE, via the communication network node. Each UE is associated to the core network by one or more PS connections, and each of the PS connections is applied by the UE for a respective PS data service. When performing the method, information related to the respective PS data service is obtained, and priority information is provided to a resource manager arranged in the communication network and enabled to perform congestion control of the PS connections based on the priority information. The priority information is based on the information related to the respective PS data service for a plurality of the PS connections.

In particular embodiments, the obtaining of information related to the respective PS data service may be initiated, when detecting a risk for congestion of the PS data in any of the PS connections. When providing priority information, a content of communicated IP packets may be analysed to determine for which PS data services the PS connections are currently applied, and a priority list for the PS connections may be put together as the priority information. The analysis of IP packets may be performed by applying a packet inspection method, e.g. Deep packet inspection. In addition may further information for the PS data connections be determined, which may be applied when prioritising, as e.g. an amount of currently communicated PS data on the PS connections By determining for which PS data services the PS connections are currently applied, and prioritise the PS connections accordingly, the communication network node may reallocate RAN communication resources to higher prioritised PS data services from less prioritised PS data services. Thereby, a more flexible and effective use of available RAN communication resources may be achieved.

According to another aspect, an arrangement for a communication network node for a communication network is provided for enabling congestion control of Packet Switched, PS, data, in the communication network. The PS data is communicated between a core network of the communication network and one or more User Equipments, UE, via the communication network node. Each UE is associated to the core network by one or more PS connections, and each of the PS connections is applied by the UE for a respective PS data service. The arrangement comprises a communication unit which is adapted to capture the PS data being communicated via the communication network node, and a congestion controller. The congestion controller is adapted to detect that there is a risk for congestion of the PS data in any of the PS connections, and is further adapted to obtain, for each of the PS connections, information related to the respective PS data service. Furthermore, the congestion controller is also adapted to provide priority information to a resource manager which is arranged in the communication network. The priority information is based on the information related to the respective PS data service for a plurality of the PS connections.

In particular embodiments, the congestion controller may be further adapted to inspect a content of IP packets communicated on the PS connection, and determine a PS data service for which the PS data of the PS connection is currently communicated. Moreover, the congestion controller may be further adapted to categorise the PS connection in one of a plurality of pre-defined service categories based on the determined type of PS data service.

By prioritising the end-users of the communicating system based on which type of service they apply, RAN communication resources can be reallocated to the end-users applying services for which are more sensitive for interruptions from end-users applying services which are less sensitive for interruptions. Thereby, a more effective use of the available RAN communication resources may be achieved with minimal affection for the end-users Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided which will achieve an effective utilise of available Radio Access Network (RAN) communication resources, and minimal reduction of end-user experience.

The radio network controller in the system comprises a Service Awareness Priority Module (SAPM), for identifying risks for getting Packet Switched (PS) data congested, and controlling allocation of available RAN communication resources in a communication system, by continuously determining what kind of PS data services the end-user currently applies, prioritising the end-users accordingly, and when appropriate reallocate RAN communication resources to PS connections applied by UE:s for PS data services which are more sensitive for interruptions, from other PS connections applied by UE:s for PS data services being less sensitive for interruptions.

The term "Service Awareness" is a term which in this description denotes various methods for determining what kind of PS data services the end-users of a communication system applies. For instance, such service awareness methods can be based on investigations of Internet Protocol (IP) packets being communicated in the communication system, or heuristic analyses of PS data services being applied in the communication system, etc.

With "Packet Inspection" is here meant various technologies for inspecting information in IP packets, which are used in communication networks for inspecting content, and/or any headers of the IP packets. Such inspection methods are today used in resource managers in mobile communication networks for identifying which PS data services being applied in the mobile communication networks, e.g. to enable the resource managers to limit specific PS data services. Packet inspection methods are today also used when searching for viruses or SPAM, to enable network nodes to remove infected packets and let remaining packets pass. Various inspection methods are typically applied for different parts of IP packets. For instance, Shallow Packet inspection is a method for inspecting IP packets up to layer 4 of the OSI model (TCP/IP) where protocol, IP addresses, and other header information is extracted from data packets. Deep Packet inspection is a more thorough inspection that extracts more information from data packets such as content and payload. Heuristic analysis uses empirical patterns from headers and IP flow metrics to determine the service used in an IP network. All these three techniques provide different levels of knowledge about the traffic and end-user services used in the network. In this way the network can for example be aware of that a certain identifiable user is using a Facebook application or making a VoIP call.

Figure 2:
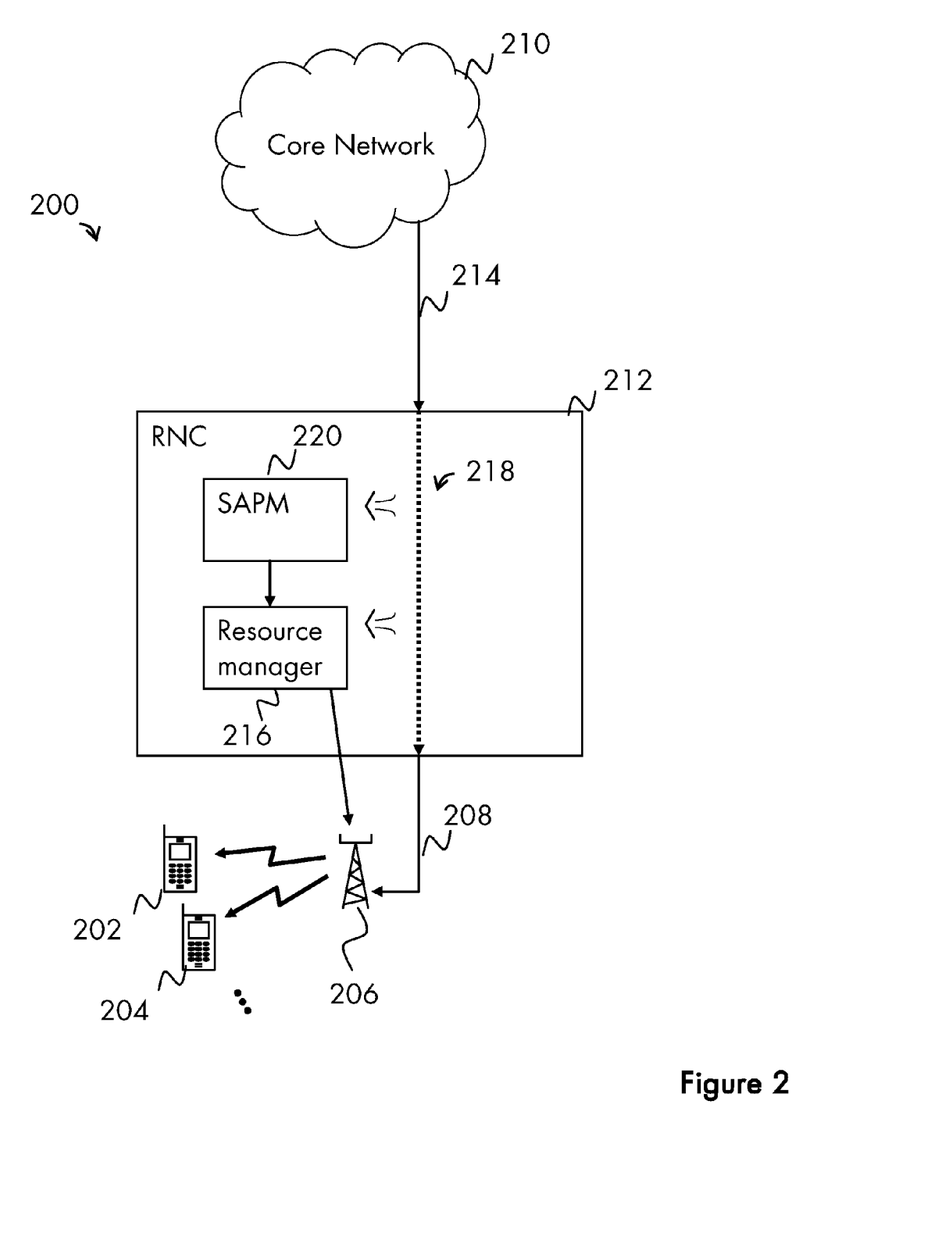
FIG. 2 is an environmental illustration of a communication system, according to some possible embodiments.

With reference to FIG. 2, which is a schematic overview, a communication system 200 will now be described, in accordance with one exemplifying embodiment.

The communication system 200 has similarities with the communication system 100 described with reference to FIG. 1. However, in the communication system 200 the radio network controller 212 is further equipped with additional functionality for congestion control.

In the communication system 200, UE:s 202, 204, . . . are communicating PS data with a core network 210. A radio access network (not referred to) and the radio network controller 212 communicates PS data between the UE:s 202, 204, . . . , and the core network 210. When communicating PS data, the radio network controller 212 receives PS data from the core network 210 on a first communication link 214, and transmits the PS data intended for specific UE:s 202, 204, . . . to a radio base station 206 on a second communication link 208, the radio base station 206 serving the specific UE:s 202, 204, . . . . The PS data flows through the radio network controller 212, and the PS data flow 218 is shown as a dotted line in the figure. For each specific UE 202, 204, . . . , one or more PS connections are set up between the respective UE 202, 204, . . . and the core network 210. Each of the UE:s 202, 204, . . . communicates PS data related to at least one PS data service, or wants to start communicating PS data related to at least one PS data service. As described above, the PS connections are logic connections. In this exemplifying embodiment, the PS connections are Radio Access Bearers (RAB). In general, the communication links between the radio base station 206 and the UE:s 202, 204, . . . have the lowest communication capacity in the communication network, and are the parts of the PS connections which are most affected by congestion. PS data between the radio base station 206 and specific UE:s 202, 204 are illustrated by flash formed arrows. In the radio network controller 212, a resource manager 216 is arranged to control allocation of RAN communication resources for the PS connections.

A Service Awareness Priority Module (SAPM) 220 is further arranged in the radio network controller 212. The SAPM 220 receives information regarding congestion from the resource manager 216, which continuously monitors the PS data flow 218 through the radio network controller 212 (illustrated with an unfilled arrow), to determine when PS data on any of the PS connections risks to become congested. The SAPM 220 also identifies which PS data services being currently applied on the PS connections (illustrated with another unfilled arrow). It is to be noted that the resource manager 216 also is capable to determine when congestion already is the case, i.e. when the risk for congested PS data is 100%

When determining whether any PS connection risks to be congested, the resource manager 216 measures a value of a parameter related to communication of PS data, and compares the measured value with a predetermined threshold value. For instance, the parameter is DownLink power, and risk for congestion is the case when the value is above a specific threshold value. However, it is to be noted that the concept is not limited to measuring Downlink power as parameter, any other suitable parameter and corresponding threshold value may alternatively be selected instead, as will be further described below in another alternative exemplifying embodiment.

When identifying which PS data services being currently applied on the PS connections, the SAPM 220 inspects the IP packets of the PS data flow 218 and analyses a content of the IP packets by applying any suitable service awareness method, i.e. any packet inspection method. In this exemplifying embodiment the IP headers of each communicated IP packet are analysed by applying Shallow packet inspection (SPI), and the PS data services are categorised in three different service categories. The three service categories are selected as in the following table:

| Service Category | PS data service |
|---|---|
| Service Category 1 | Streamed audio/video, Voice over IP, Gaming services |
| Service Category 2 | Web Browsing, e-mail, application traffic |
| Service Category 3 | Software updates, File sharing, Peer to peer |

The SAPM 220 prioritises the PS connections according to the table above, i.e. according to which service category they belong to, and prepares a priority list over the PS connections, and provides the priority list to the resource manager 216. An example of such a priority list is shown below.

| Priority | PS Connection | PS data service/ Service category | Amount of PS data |
|---|---|---|---|
| 1 | PSC2 | VoIP/SC1 | 50 kb/s |
| 2 | PSC5 | Gaming/SC1 | 100 kb/s |
| 3 | PSC1 | E-mail/SC2 | 20 kb/s |
| 4 | PSC20 | SW Update/SC3 | 100 kb/s |
| . | . | . | . |
| . | . | . | . |
| . | . | . | . |
| N | PSC8 | Peer to peer/SC3 | 150/s |

In the example above of the priority list, a plurality of PS connections are prioritised and sorted. In the priority list, data for each of the PS connections is presented on one respective row, with the highest prioritised PS connection on the first row and the lowest prioritised one on the last row. The first column shows the priority of the PS connections and the second column shows a specific individual reference of the PS connections, e.g. PS5 for the PS connection number 5. The third column shows which PS data service being currently applied on the PS connections. The fourth column, which is optional, shows the amount of PS data being currently communicated on the PS connections. The third column may also in addition present which service category the PS data service belongs to.

It is to be noted that even if the priority list in this exemplifying embodiment is implemented as a file comprising data according to the table shown above, the designer may select to implement the priority list different. For instance, he/she may implement the priority list as a series of references of the PS connections, e.g. as "PSC2, PSC5, PSC1, PSC20, . . . , PSC8", or present only PS connections which are candidates to get reduced RAN communication resources.

The resource manager 216 does also perform congestion control of PS data in the communication system and reallocates RAN communication resources from the lowest prioritised PS connections based on the priority list, to minimise the risk for reduced end user experience. The resource manager 216 does also instruct the radio base station 206 of the result of the reallocation. For instance, the SAPM 220 will prioritise a first PS connections applied for a VoIP call before a second PS connection applied for peer to peer networking, and the resource manager 216 will instruct the radio base station 206 that RAN communication resources is reallocated from the second PS connection, illustrated by an arrow between the resource manager 216 and the radio base station 206. Moreover, a PS connection of a new UE which wants to start communicate PS data may per default be placed on the priority list as if the PS connection was applied for a PS data service of service category two, which enables the SAPM 220 to place the PS connections of the new UE on the priority list. In this embodiment example, the congestion control is performed based on the received priority list. By using the priority list as basis for resource allocation, the resource manager 216 is enabled to perform congestion control and reallocate RAN resources more flexible, thereby minimising negative user experience.

In an alternative embodiment, based on the one above, The SAPM 220 is further adapted to determine some PS connection to reallocate RAN communication resources to, based on the prioritising. It is also to be noted that the service categories may be selected different within the concept, for instance a service placed in one service category may alternatively be placed in another service category, another amount of service categories may be applied instead, etc. It is also to be noted that a designer is not limited to inspect the IP header of every communicated packet of PS data, he/she may alternatively devise any suitable method of inspecting packets and select a suitable amount of packets, e.g. inspecting the header of every second packet, inspecting the pay-load of every $10^{th}$ packet, perform any heuristic analysis of every $4^{th}$ packet, etc.

Furthermore, in another alternative embodiment based on some embodiments above, the resource manager 216 may further obtain any other information from the PS data flow 218, e.g. an amount of PS data being currently communicated, and apply both the received priority list and the obtained information as basis when reallocating RAN resources.

In the FIG. 2, the resource manager 216 and the service awareness module 220 are illustrated as separate functional units in order to make the understanding of the described concept easier. However, it should be noted that the skilled person is free to implement these functions in practice using any suitable software and hardware means. For instance, any functionality in a specific functional unit may be placed in another suitable functional unit, where appropriate.

Figure 3:
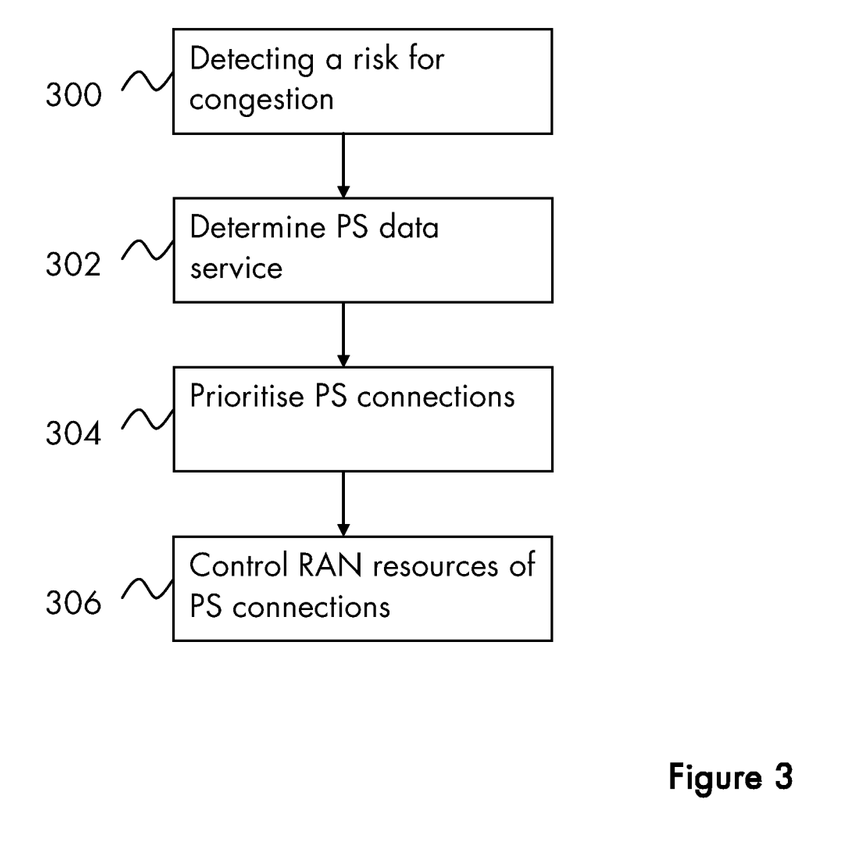
FIG. 3 is a flow chart illustrating a procedure in an arrangement, according to further possible embodiments.

With reference to FIG. 3, which is a schematic flow chart, a method for congestion control in a communication network node will now be described, in accordance with one exemplifying embodiment.

A service awareness priority module (SAPM) and a resource manager are arranged in a radio network controller (RNC) of a communication network. The communication network comprises a core network associated to the RNC, and one or more radio base stations associated to the RNC, where each radio base station is further associated to one or more UE:s. In the communication network, PS data is communicated on PS connections for PS data services applied by end-users of the UE:s.

In a first action 302 the SAPM analyses PS data communicated through the RNC on the PS connections to determine which PS data services being applied on the PS communications. In the PS connections, the PS data is communicated as IP packets and the SAPM inspects a content of the IP packets to identify which for which PS data service PS data is communicated. In this exemplifying embodiment, the pay-load of the IP packets is inspected by applying so called Deep Packet Inspection, which is defined above.

Then, in a subsequent action 304 the SAPM prioritises the PS connections, based on which PS data services they are applied for, and categorises the PS connections in a plurality of service categories accordingly, as discussed above in another exemplifying embodiment. Furthermore, the SAPM puts together a priority list over the PS connections according to the prioritising and provides the priority list to the resource manager, to be applied by the resource manager when reallocating RAN communication resources between the PS connections.

In a final action 306, which is performed in the resource manager, RAN communication resources are reallocated between the PS connections according to the priority list. Here the resource manager reallocates RAN communication resources from PS communications according the priority list by reducing a priority in a High Speed, HS, scheduler arranged in the RNC. However, the concept is not limited thereto, and any other suitable process for reallocating resource may be applied instead, as e.g. reducing a rate in a an Enhanced Uplink, EUL, scheduler; down switching a rate in R99 data; down switching to a Forward Access Channel, FACH.

By being aware of which PS data services being applied on the PS connections, RAN communication resources can be reallocated to PS connections applied for more prioritised PS data services from PS connections being applied for less prioritised PS data services, which may achieve a flexible and effective use of available communication resources. Moreover, when reallocating RAN communication resources in a controlled way, the risk for congestion of PS data may be reduced.

In an alternative exemplifying embodiment, based on the above one, in a first action 300 preceding action 302, the resource manager detects whether there is a risk for congestion of PS data on any of the PS connections. The detection is performed by measuring a value of a parameter related to the communication of PS data, and comparing the measured parameter value with a predetermined congestion threshold value. Here, the parameter is selected as Transport Network capacity, and the threshold is predetermined to a value indicating that there is a risk for getting the PS data on any PS connections congested. However, the concept is not limited to applying Transport Network Capacity as parameter. Any other suitable parameter and corresponding threshold condition may alternatively be selected instead, e.g. DownLink power, High Speed Downlink Packet Access codes, Radio Signal Strength Indication, HardWare in terms of Channel Element, number of High Speed Packet Access users, Air Interface Speech Equivalent for Downlink or Uplink, node capacity, and processor load. When applying Transport Network Capacity as parameter, there is a risk for congestion when the measured parameter value is below the corresponding threshold value. However, when another parameter is applied instead, the corresponding threshold value is selected so that there is a risk for congestion when the measured parameter value is above the threshold value, e.g. when applying the number of High Speed Packet Access users as parameter. Also combinations of these parameters may alternatively be applied. Channel Element (CE) is a virtual load unit that is used for load cost measurements for different RABs (Radio Access Bearers). For instance Enhanced Uplink (EUL) 2 ms TTI (Transmission Time Interval) costs 2CE, and if a UE wants to set up EUL 2 ms TTI a request will go to the Radio Network Controller, which will accept or deny this RAB to establish EUL depending on how many CEs there are left to use.

In an alternative exemplifying embodiment, based on any of the exemplifying embodiments described above, the PS connections are further prioritised within each service category, in action 304. The further prioritising is then based on an amount of PS data being currently communicated. The amount of PS data being currently communicated in the PS connections is in this alternative embodiment determined by the SAPM in action 302. Here, within each priority group, the PS connections are prioritised from the PS connections communicating the smallest amount of PS data to the PS communications communicating the largest amount of PS data. Thus, the resource manager will then first reallocate RNC resources from PS connections of priority group 3 and start with PS connections communicating large amount of PS data. When there remain no PS connections in group 3, the resource manager proceeds with PS connections from priority group 2 applying large amounts of PS data, etc.

Furthermore, it is to be understood that a skilled person realises how to combine characterising features of the above described embodiments, when devising a method for congestion control. For instance, he/she may select a suitable method for packet inspection, a suitable number of service categories, and a suitable policy for prioritising the PS connections.

Figure 4:
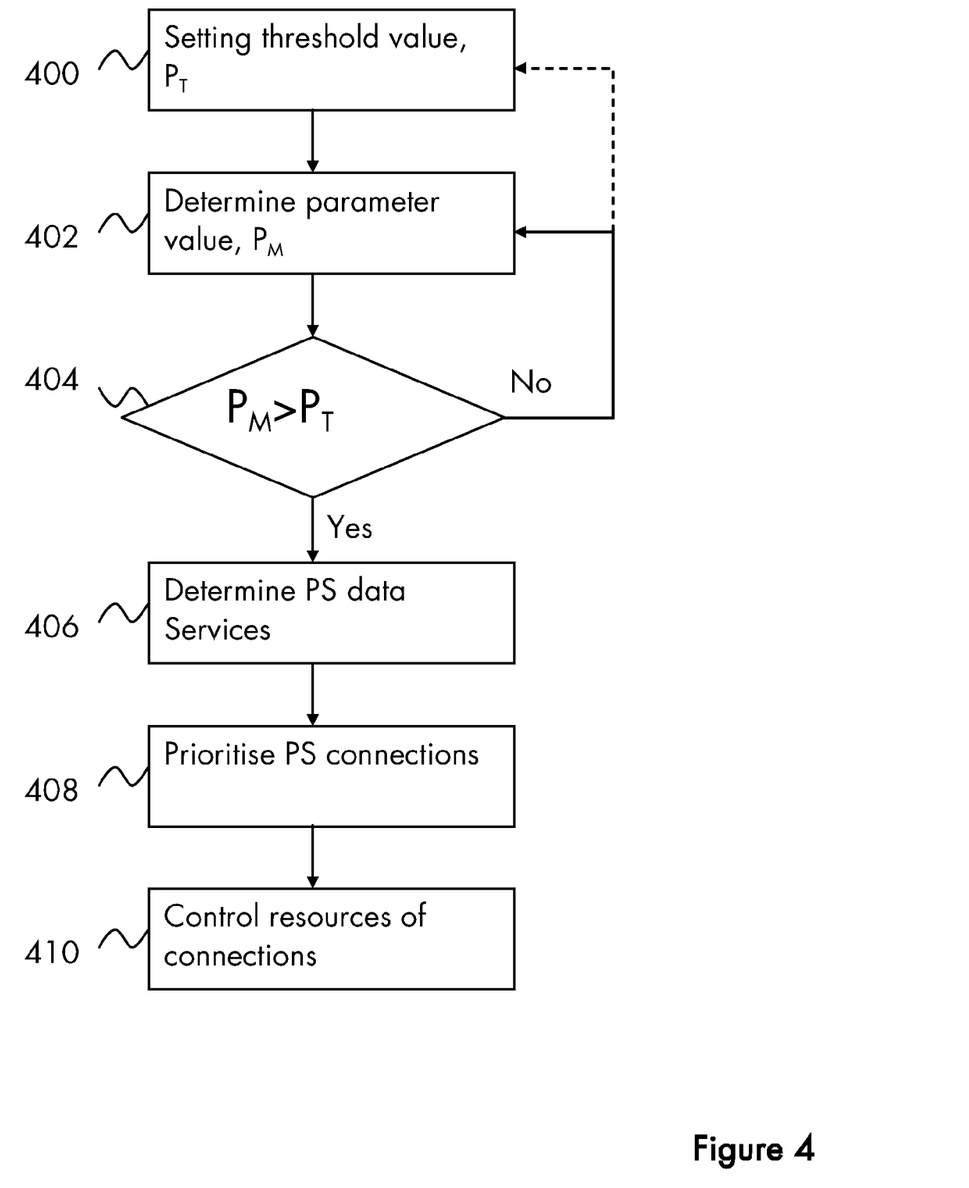
FIG. 4 is a flow chart illustrating a procedure in an arrangement, according to further possible embodiments.

With reference to FIG. 4, which is a schematic flow chart, a method in communication network node will now be described, in accordance with one exemplifying embodiment.

Correspondingly, to one embodiment described above, a service awareness priority module (SAPM) is arranged in an RNC of a communication network. The communication network comprises a core network associated to the RNC, and one or more radio base stations associated to the RNC, where each radio base station is further associated to one or more UE:s. In the communication network, PS data is communicated on PS connections for PS data services applied by end-users of the UE:s.

In a first action 400, a congestion threshold value $P_T$ of a parameter is set. The congestion threshold value $P_T$ is selected to indicate that there is risk for congestion of PS data in one or more of the PS connections. In this embodiment example, the parameter is selected as a number of High Speed Packet Access (HSPA) users served by the RNC.

In a following action 402, the SAPM determines the current value $P_M$ of the parameter of the congestion threshold. Here the number of HSPA users is determined by analysing the PS data communicated on the PS connections through the RNC.

Then, in a subsequent action 404 the SAPM decides whether a congestion condition is fulfilled or not, by comparing the current parameter value $P_M$ of the number of HSPA users with the threshold value $P_T$. When the SAPM decides that there is a risk for congested PS data, the process proceeds with determining for which PS data services PS data is communicated on the PS connections, in action 406. Else, when the comparing does not indicate any risk for congested PS data, the SAPM returns to the action 402 and continues determining the current parameter value $P_M$.

In a following action 406, when there was decided that there is risk for congested PS data on any of the PS connections, the SAPM determines for which PS data services PS data is communicated on the PS connections. When determining the PS data services, the SAPM analyses the PS data being communicated through the RNC and inspects a content of IP packets being communicated, which was discussed above in another embodiment example.

Then in a following action 408, the SAPM categorises the PS connections in a plurality of service categories based on which PS data services being applied on them, and puts together a priority list over the PS connections. The priority list is based on the categorising, and may be implemented as in the example described above in another embodiment. The priority list is then provided to the resource manager, to enable reallocation of RAN communication resources based on the priority list. The PS connections are here categorised according to the table, shown above for another embodiment. However, it is to be understood that the priority list could be implemented differently, e.g. it may comprise another number of service categories, or the PS data services may be placed in different service categories.

Likewise to in an example embodiment described above, in a final action 410, which is performed in the resource manager, RAN communication resources are reallocated between the PS connections according to the priority list.

In an alternative exemplifying embodiment, based on the one described above, the SAPM may further comprise more than one congestion threshold value. For instance, in action 400, a first congestion threshold value will be selected to indicate that there is risk for congested PS data in one or more PS connections, and a second congestion threshold will be selected to indicate that congestion of PS data is already the case. By implementing more than one congestion threshold values, the SAPM may perform the prioritising of action 408 more precise and flexible. For instance, when detecting that congestion of PS data is already the case, the resource manager may, in action 410, reallocate a larger amount of RAN communication resources than when there is just a risk for congested PS data. Moreover, the SAPM may further be adapted to reconfigure the congestion threshold value to a suitable value in action 400 (indicated with a dashed arrow), e.g. due to the configuration or the structure of the communication system. Furthermore, regarding both the methods of the embodiment examples described with reference to FIGS. 3 and 4, respectively, the current parameter value $P_M$ is typically monitored and determined continuously in action 402 to identify risks for congested PS data. Even the PS data services may be determined continuously in action 406, and the result may be stored in a memory of the SAPM. With access and knowledge of which PS data services that have been applied, the SAPM will be able to make use also of historical information of used PS data services when prioritising the PS connections.

Figure 5:
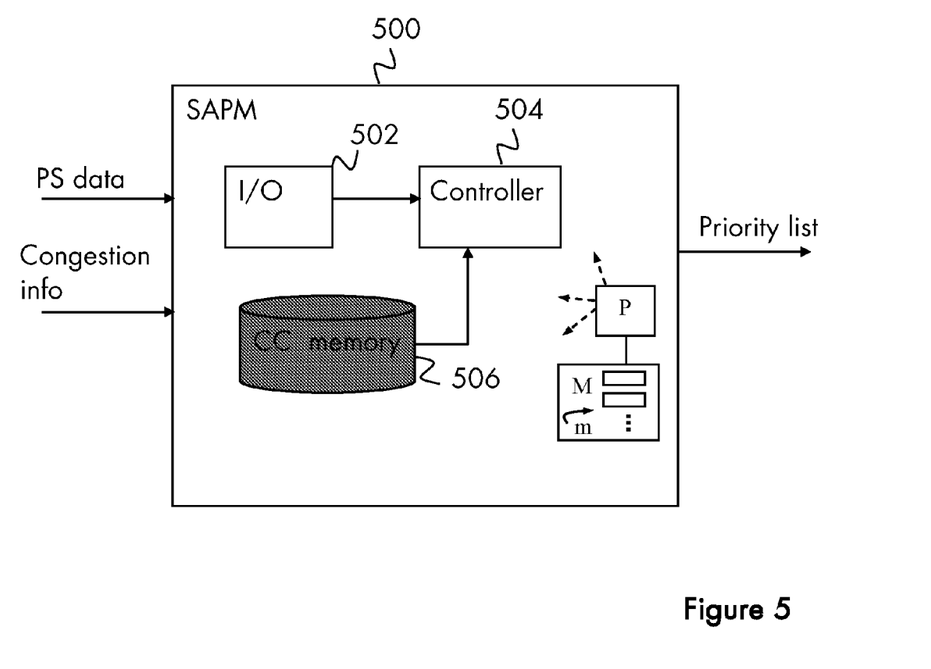
FIG. 5 is a block diagram illustrating an arrangement for congestion control, according to further possible embodiments.

With reference to FIG. 5, which is a schematic block diagram, a Service Aware Priority Module, SAPM, 500, in a Radio Network Controller (RNC), (not shown), will now be described in accordance with an exemplifying embodiment. The SAPM 500 comprises a communication unit 502, a congestion controller 504, and optionally a congestion control memory 506. The congestion control memory 506 will be described below in another alternative embodiment.

The SAPM 500 is adapted to determine which type of PS data services PS connections of a communication system is currently applied, the communication system comprising the RNC. The SAPM 500 is further adapted to prioritise the PS connections according to the applied PS data services, and provide a priority list to a resource manager, to enable the resource manager to reallocate RAN communication resources between different PS connections.

The communication unit 502 is adapted to monitor and capture PS data communicated through the RNC and provide to the congestion controller 504. In this exemplifying embodiment, the communication unit 502 is implemented as a software module. However, the described concept is not limited thereto, and the communication unit 502 may alternatively be implemented as any suitable arrangement of hardware or software which is capable to capture PS data from a PS data stream.

The congestion controller 504 is adapted to obtain information regarding which PS data services being applied on the PS connections. In this embodiment, the congestion controller 504 inspects the payload of IP packets of the PS data captured by the communication unit 502 by applying so called packet inspection, as described above in another embodiment. The congestion controller 504 is further adapted to prioritise the PS connections and categorise those in a plurality of service categories based on which PS data services they currently apply, and put together a priority list of the PS connections, accordingly. Furthermore, the congestion controller 504 is adapted to provide the priority list to the resource manager, the priority list to be applied by the resource manager for reallocating RAN communication resources from a first PS connection to a second PS connection. In this exemplifying embodiment the congestion controller 504 is implemented as a special purpose microprocessor, e.g. in form of an Application Specific Integrated Circuit (ASIC). However, the concept is not limited thereto, the congestion controller 504 may be implemented as any suitable processor, e.g. an instruction set processor and/or related chips sets.

In an alternative exemplifying embodiment, which is based on the one described above, the resource manager (not shown) is adapted to detect when there is a risk for congested communication of PS data on any PS connection, and initiate the communication unit 502 to start capturing PS data. The communication unit 502 is then initiated upon reception of congestion information from the resource manager. The congestion controller 504 is here further adapted receive from the resource manager information regarding which PS data services being applied on the PS connections. Furthermore, the congestion control memory 506 is included in the SAPM 500 and is adapted to store information regarding the service categories and/or PS data services of the PS connections. In this exemplifying embodiment, the control memory 506 is implemented as a Random-Access Memory (RAM). However, any other suitable memory type may be used instead when implementing the control memory 506 e.g. a Flash memory, etc.

By arranging the congestion control memory 506 in the SAPM 500, the congestion controller 504 may store the current service categories of the PS connections, and obtain historical behaviours of the PS connections or end-users, when putting together the priority list. By including the congestion control memory 506 in the SAPM 500, abrupt changes of PS data services for PS connections do not immediately have to give rise to a lower service category for the PS connections, and decreased communication resources. Thereby a more robust behaviour of the SAPM 500 may be achieved.

In addition, the congestion controller 504 may optionally be adapted to obtain further information to be applied when prioritising the PS connections. Such further information may comprise e.g. subscription categories of end-users, etc.

Even if some of the exemplifying embodiments described above, are described for PS data communicated in Downlink from a core network to specific end-users, a skilled person realises how to modify the methods and arrangement to implement the concept for PS data communicated in Uplink from specific end-users to a core network.

It should be noted that FIG. 5 illustrates various functional units in the SAPM 500 and the skilled person is able to implement these functional units in practice using suitable software and hardware. Thus, the solution is generally not limited to the shown structures of the SAPM 500, and the functional units 502, 504, 506 may be configured to operate according to any of the features described in this disclosure, where appropriate. For instance, any functionality in a specific functional unit may be placed in another suitable functional unit, where appropriate.

The functional units 502, 504, 506 described above can be implemented in the SAPM 500 by means of program modules of a respective computer program comprising code means which, when run by a processor "P" causes the SAPM 500 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the SAPM 500 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the SAPM 500.

By gaining knowledge of what PS data services being currently applied on the PS connections and apply that knowledge when prioritising the PS connections, a more precise prioritising is achieved, resulting in a more efficient use of available RAN communication resources without affecting existing end-users substantially. Thereby, the RNC may be able to reallocate RAN communication resources to PS connections of existing end-users who wants to increase their amount of communicated PS data, and/or PS connections of new end-users who want to start communicating PS data.

Moreover, by being aware of which PS data services being currently applied, RAN communication resources can be reallocated from PS connections applied for less prioritised services to PS connections for new end-users or existing end-users applying PS connections for more prioritised services, without noticeable deterioration for the end-users applying the less prioritised services.

While the solution has been described with reference to specific exemplary embodiments, the description is generally only intended to illustrate the inventive concept and should not be taken as limiting the scope of the solution. When designing an arrangement or devising a method for service aware congestion control, the implementing designer is free to combine features from the described exemplifying embodiments.

The solution is defined by the appended claims.

ABBREVIATIONS

DPI Deep Packet Inspection
P2P Peer-to-peer
RAB Radio Access Bearer
RMF Resource Management Function
SA Service Awareness
SAPM Service Awareness Priority Module
VoIP Voice over Internet Protocol

The invention claimed is:

1. A method in a communication network node for a communication network for enabling congestion control of Packet Switched (PS) data, in the communication network, the PS data being communicated between a core network of the communication network and one or more User Equipments (UEs) via the communication network node, where each UE is associated to the core network by one or more PS connections, and each of the PS connections is applied by the UE for a respective PS data service, the method comprising:

obtaining information related to the respective PS data service, wherein obtaining the information related to the respective PS data service comprises:
inspecting a content of communicated packets for the PS connection, wherein the inspected content is at least one of headers of communicated packets for the PS connection and payload of the communicated packets; and determining, based on the inspected content of the communicated packets, a type of PS data service for which the PS data of the PS connection is currently communicated; and providing priority information for each of a plurality of the PS connections to a resource manager arranged in the communication network, the priority information being based on the information related to the respective PS data service for the plurality of the PS connections, wherein providing the priority information comprises:

categorizing the PS connection in one of a plurality of pre-defined service categories at least based on the determined type of PS data service;

putting together a priority list of the plurality of the PS connections, the priority list prioritizing the plurality of PS connections with respect to each other, based on the categorizing; and providing the priority list to the resource manager, wherein the resource manager is enabled to perform congestion control of the PS connections based on the priority information.

2. The method of claim 1, further comprising detecting a risk for congestion of the PS data in any of the PS connections, wherein a detected risk for congestion initiates the obtaining of information.

3. The method of claim 2, wherein detecting a risk for congestion comprises:

setting a threshold value for a parameter related to communication of the PS data;

determining a parameter value of the parameter related to communication of the PS data;

comparing the parameter value with the threshold value; and deciding that there is a risk for congested PS data, based on the comparing.

4. The method of claim 3, wherein the parameter related to communication of the PS data is any of: Downlink power, Transport Network capacity, High Speed Downlink Packet Access codes, Radio Signal Strength Indication, Hardware in terms of Channel Element, number of High Speed Packet Access users, Air Interface Speech Equivalent for Downlink or Uplink, node capacity, and processor load.

5. The method of claim 1, wherein the obtaining of information related to the respective PS data service further comprises determining an amount of PS data being currently communicated, and the categorizing of the PS connection is further based on the determined amount of currently communicated PS data.

6. The method of claim 1, further comprising storing the determined type of PS data service, and wherein the categorizing of the PS connection is further based on heuristics of previously determined types of PS data services for a UE associated by the PS connection.

7. The method of claim 1 wherein the type of PS data services is one of: Streamed Video, Streamed Audio, Voice over Internet Protocol, Gaming Services, Web Browsing, E-mail, Application Traffic, File uploading, File downloading, Software updating, and Peer to Peer communication.

8. The method of claim 1 wherein the PS connection is categorized in one of a plurality of predefined service categories due to the determined type of PS data service.

9. The method of claim 8, wherein there are three predetermined service categories: a first service category comprising Streamed Video, Streamed Audio, Voice over Internet Protocol, and Gaming Services; a second service category comprising Web browsing, Application traffic, and E-mail; and a third service category comprising Peer to Peer communication, File uploading, File downloading and Software updating.

10. The method according claim 8, wherein a new PS connection, for which no prior determined type of PS data service is stored, is categorized in one specific of the predetermined second categories, as default.

11. A method in a communication network node for a communication network for enabling congestion control of Packet Switched (PS) data, in the communication network, the PS data being communicated between a core network of the communication network and one or more User Equipments (UEs) via the communication network node, where each UE is associated to the core network by one or more PS connections, and each of the PS connections is applied by the UE for a respective PS data service, the method comprising:

obtaining information related to the respective PS data service; and providing priority information for each of a plurality of the PS connections to a resource manager arranged in the communication network, the priority information being based on the information related to the respective PS data service for the plurality of the PS connections, wherein the priority information is a priority list of one or more PS communications to get currently allocated communication resources reallocated there from, the priority being based on the categorizing of the PS communications, wherein the resource manager is enabled to perform congestion control of the PS connections based on the priority information.

12. The method of claim 11, wherein there are three predetermined service categories: a first service category comprising Streamed Video, Streamed Audio, Voice over Internet Protocol, and Gaming Services; a second service category comprising Web browsing, Application traffic, and E-mail; and a third service category comprising Peer to Peer communication, File uploading, File downloading and Software updating, and wherein the priority list comprises: first, the PS connections categorized in the first service category; second, the PS communications categorized in the second category; and third, the PS communications categorized in the third category.

13. The method of claim 12, wherein within each of the service categories, the PS communications on the priority list are sorted according to the determined amount of currently communicated PS data.

14. The method of claim 12, wherein the resource manager when performing congestion control reallocates communication resources from PS communications according to the priority list, by performing one or more of: reducing a priority in a High Speed (HS) scheduler arranged in the communication network node; reducing a rate in an Enhanced Uplink (EUL) scheduler; down switching a rate in R99 data; and down switching to a Forward Access Channel (FACH).

15. An arrangement for a communication network node for a communication network for enabling congestion control of Packet Switched (PS) data, in the communication network, the PS data being communicated between a core network of the communication network and one or more User Equipments (UEs) via the communication network node, where each UE is associated to the core network by one or more PS connections, and each of the PS connections is applied by the UE for a respective PS data service, the arrangement comprising:

a communication circuit adapted to capture the PS data being communicated via the communication network node; and a congestion controller adapted to:
- detect that there is a risk for congestion of the PS data in any of the PS connections;
- obtain information related to the respective PS data service by:
  - inspecting a content of communicated packets for the PS connection, wherein the inspected content is at least one of headers of communicated packets for the PS connection and payload of the communicated packets; and
  - determining, based on the inspected content of the communicated packets, a type of PS data service for which the PS data of the PS connection is currently communicated; and
- provide priority information for each of a plurality of the PS connections to a resource manager arranged in the communication network, the priority information being based on the information related to the respective PS data service for the plurality of the PS connections, wherein the congestion controller is adapted to provide the priority information by:
  - categorizing the PS connection in one of a plurality of pre-defined service categories at least based on the determined type of PS data service;
  - putting together a priority list of the plurality of the PS connections, the priority list prioritizing the plurality of PS connections with respect to each other, based on the categorizing; and
  - providing the priority list to the resource manager.

16. The arrangement of claim 15, further comprising a congestion control memory adapted to store the determined types of PS data services, and wherein the congestion controller is further adapted to base the categorization of the PS connection on heuristics of previously determined types of PS data, the types of PS data being stored in the congestion control memory.

17. A communication network node comprising the arrangement of claim 15.

* * * * *